United States Patent
Fu et al.

(10) Patent No.: US 8,843,998 B2
(45) Date of Patent: Sep. 23, 2014

(54) APPARATUS, SYSTEMS AND METHODS FOR SECURE AND SELECTIVE ACCESS TO SERVICES IN HYBRID PUBLIC-PRIVATE INFRASTRUCTURES

(75) Inventors: Tianying Fu, San Jose, CA (US); Gaurav Manglik, Mountain View, CA (US); Xuefeng Zhu, Mississauga (CA)

(73) Assignee: Cliqr Technologies, Inc., San Jose, CA (US)

( * ) Notice: Subject to any disclaimer, the term of this patent is extended or adjusted under 35 U.S.C. 154(b) by 0 days.

(21) Appl. No.: 13/304,582

(22) Filed: Nov. 25, 2011

(65) Prior Publication Data
US 2012/0331528 A1 Dec. 27, 2012

Related U.S. Application Data

(60) Provisional application No. 61/501,726, filed on Jun. 27, 2011.

(51) Int. Cl.
*G06F 12/00* (2006.01)
*H04L 29/06* (2006.01)
*H04L 29/08* (2006.01)

(52) U.S. Cl.
CPC ............ *H04L 67/10* (2013.01); *H04L 63/0272* (2013.01)
USPC ............... 726/3; 709/201; 709/219; 709/225; 709/226; 726/1; 726/7; 726/26; 726/27; 707/785; 707/827; 711/E12.001; 711/E12.093; 711/163; 713/165; 713/167

(58) Field of Classification Search
CPC ...... H04L 67/10; H04L 63/0272; H04L 63/10; H04L 67/1097; H04L 12/4633
USPC .................................................. 726/7; 718/1
See application file for complete search history.

(56) References Cited

U.S. PATENT DOCUMENTS

| | | | |
|---|---|---|---|
| 8,250,215 B2 * | 8/2012 | Stienhans et al. ............. | 709/227 |
| 2008/0104393 A1 * | 5/2008 | Glasser et al. ............... | 713/165 |
| 2010/0251328 A1 * | 9/2010 | Syed et al. ................... | 726/1 |
| 2010/0306772 A1 * | 12/2010 | Arnold et al. ................ | 718/1 |
| 2010/0332617 A1 * | 12/2010 | Goodwin et al. ............. | 709/219 |
| 2011/0016214 A1 * | 1/2011 | Jackson ....................... | 709/226 |
| 2011/0022812 A1 * | 1/2011 | van der Linden et al. .... | 711/163 |
| 2011/0072487 A1 * | 3/2011 | Hadar et al. ................. | 726/1 |
| 2011/0087690 A1 * | 4/2011 | Cairns ......................... | 707/769 |
| 2011/0110377 A1 * | 5/2011 | Alkhatib et al. ......... | 370/395.53 |
| 2011/0153697 A1 * | 6/2011 | Nickolov et al. ............ | 707/827 |
| 2011/0231899 A1 * | 9/2011 | Pulier et al. ................. | 726/1 |
| 2011/0265164 A1 * | 10/2011 | Lucovsky et al. ............ | 726/7 |
| 2011/0296023 A1 * | 12/2011 | Ferris et al. ................. | 709/226 |
| 2011/0302312 A1 * | 12/2011 | McCrory ..................... | 709/226 |
| 2012/0131591 A1 * | 5/2012 | Moorthi et al. .............. | 718/104 |
| 2012/0203823 A1 * | 8/2012 | Manglik et al. .............. | 709/203 |

(Continued)

*Primary Examiner* — Morshed Mehedi
*Assistant Examiner* — Sharon Lynch
(74) *Attorney, Agent, or Firm* — Venkatesh Krishnamoorthy; Silicon Valley Patent Group LLP

(57) ABSTRACT

Embodiments of apparatus, systems and methods facilitate deployment of distributed computing applications on hybrid public-private infrastructures by facilitating secure access to selected services running on private infrastructures by distributed computing applications running on public cloud infrastructures. In some embodiments, a secure tunnel may be established between proxy processes on the public and private infrastructures and communication between the distributed computing application and the selected services may occur through the proxy processes over the secure tunnel.

16 Claims, 5 Drawing Sheets

(56) References Cited

U.S. PATENT DOCUMENTS

| | | | |
|---|---|---|---|
| 2012/0222104 A1* | 8/2012 | Boldyrev et al. | 726/8 |
| 2012/0236761 A1* | 9/2012 | Yang et al. | 370/259 |
| 2012/0254966 A1* | 10/2012 | Parker | 726/7 |
| 2012/0281708 A1* | 11/2012 | Chauhan et al. | 370/401 |
| 2012/0284380 A1* | 11/2012 | Anderson et al. | 709/223 |
| 2012/0297066 A1* | 11/2012 | Hewett | 709/226 |
| 2012/0303778 A1* | 11/2012 | Ahiska et al. | 709/223 |
| 2012/0311156 A1* | 12/2012 | DeJana et al. | 709/226 |
| 2013/0066940 A1* | 3/2013 | Shao | 709/201 |
| 2013/0179573 A1* | 7/2013 | McCarty | 709/225 |

* cited by examiner

APPARATUS, SYSTEMS AND METHODS FOR SECURE AND SELECTIVE ACCESS TO SERVICES IN HYBRID PUBLIC-PRIVATE INFRASTRUCTURES

CROSS REFERENCES TO RELATED APPLICATIONS

This application claims the benefit of and priority to co-pending U.S. Provisional Application No.: 61/501,726, filed Jun. 27, 2011, entitled "Apparatus, Systems and Methods for-Optimal Deployment and Management of Distributed Computing Systems and Applications," which is hereby incorporated by reference in its entirety for all purposes. Further co-pending U.S. patent application Ser. No.: 13/024,302 filed Feb. 9, 2011, entitled "Apparatus, Systems and Methods for Deployment and Management of Distributed Computing Systems and Applications," which is assigned to assignee of the present application, is also hereby incorporated by reference in its entirety for all purposes.

BACKGROUND

1. Field of the Invention

The present invention relates to the field of distributed computing and in particular, to apparatus, systems, and methods to facilitate secure access to selected services during computations performed using hybrid public-private infrastructures.

2. Description of Related Art

The performance of computing applications may often be increased by distributing the computational workload across nodes in a cluster of computers. For example, the performance of compute intensive applications such as DNA sequencing, financial modeling, weather simulations, electronic design automation, etc. can be significantly improved by distributing the applications across nodes in computing clusters. The evolution of "Cloud computing services" or "public clouds", which provide on-demand access to computing capabilities over the Internet, is an attempt to increase efficiencies and scalability, while reducing the costs associated with large computing clusters.

"Cloud computing" can refer to the use of a company's own computer cluster, but more often the term refers to the use of publicly available computing resources over the Internet through Web browser-based or client-side applications. Clouds or cloud infrastructures are typically made available on an on-demand basis. Cloud computing enables organizations to run applications on reliable, highly-available, and scalable software and hardware infrastructures referred to as clouds. Clouds may use virtualization or sophisticated systems management solutions to provide a flexible, fault tolerant, and highly available view of underlying resources so that dedicated hardware resources can be dynamically shared across several users instead of being assigned individually.

Cloud computing resources, which are often made available as virtual machines (and in some instances as physical machines), may be accessed using Application Programming Interfaces ("APIs") and self-service portals—such as websites accessed using a web browser. Cloud infrastructure, which is offered by companies such as Amazon™ EC2, Terremark™, Rackspace™, and Savvis™ refers to the provision of Infrastructure as a Service (IaaS) and permits fee-based on-demand access to the power of computing clusters and datacenters over the Internet. In some instances, organizations may use virtualization and convert their private datacenters into clouds as well. These are termed private clouds.

As used herein, the term cloud can refer to both public and private clouds, which can be set-up as virtualized or physical compute clusters.

One drawback in running distributed computing applications on cloud infrastructures is the need for services used by applications to be available and accessible at runtime on the cloud infrastructure. Typical distributed computing applications may be composed of several components that may interact with each other as well as with services which, in some instances, can reside outside the core application.

In some instances, it may not be desirable for one or more services to reside on the cloud infrastructure. Security, performance, cost, difficulty in porting, legal issues, and/or other business related concerns may make it difficult or impractical to migrate and/or run some service components on the cloud infrastructure. Accordingly, some services may continue to be deployed or made available on a user's private infrastructure behind a firewall, while other parts of the distributed computing application may be run on public cloud infrastructure. In situations where such hybrid public-private infrastructures are desirable, difficulties arise when portions of the application running on the public cloud infrastructure request communication or interaction with services deployed on the private infrastructure. Because services deployed on private infrastructures are protected by firewalls they are not usually accessible to application portions running on the public cloud infrastructure. Accordingly, when applications are run on hybrid infrastructures, access to privately deployed services may involve making changes or exceptions to existing security policies that may be cumbersome to perform and can also increase vulnerabilities to the security of the private infrastructure.

Therefore, there is a need for apparatus, systems, and methods that facilitate secure, seamless, and transparent access to select services available in a private infrastructure to authorized applications running on a public cloud with minimal changes to the security policies of the private infrastructure.

SUMMARY

Consistent with embodiments disclosed herein, apparatus, systems and methods for providing authorized applications running on a public cloud secure access to selected services running on a private infrastructure are presented. In some embodiments, a method for securely accessing services on a first infrastructure from a distributed computing application running on a second infrastructure comprises: instantiating a first proxy on the first infrastructure, wherein the first proxy is identified by a first network address and a first port number; instantiating a second proxy on the second infrastructure wherein the second proxy is identified by a second network address and port number; configuring the distributed application to access the at least one service using the second network address and port number; and establishing at least one secure tunnel between the first proxy and the second proxy, wherein: the second proxy sends access requests received from the distributed computing application to the first proxy over the secure tunnel using the first network address and port number, and the first proxy forwards the access request to the at least one service. In some embodiments, the first infrastructure may be a private infrastructure, while the second infrastructure may be a public cloud infrastructure.

Embodiments also relate to software, firmware, and program instructions created, stored, accessed, or modified by computers and/or processors using computer-readable media or computer-readable memory. The methods described may be performed on various computing devices including distributed computing systems such as clouds.

These and other embodiments are further explained below with respect to the following figures.

DETAILED DESCRIPTION

In accordance with embodiments disclosed herein, apparatus, systems and methods for providing authorized applications running on a public cloud secure access to selected services running on a private infrastructure the deployment and management of distributed computing systems and are presented.

Figure 1:
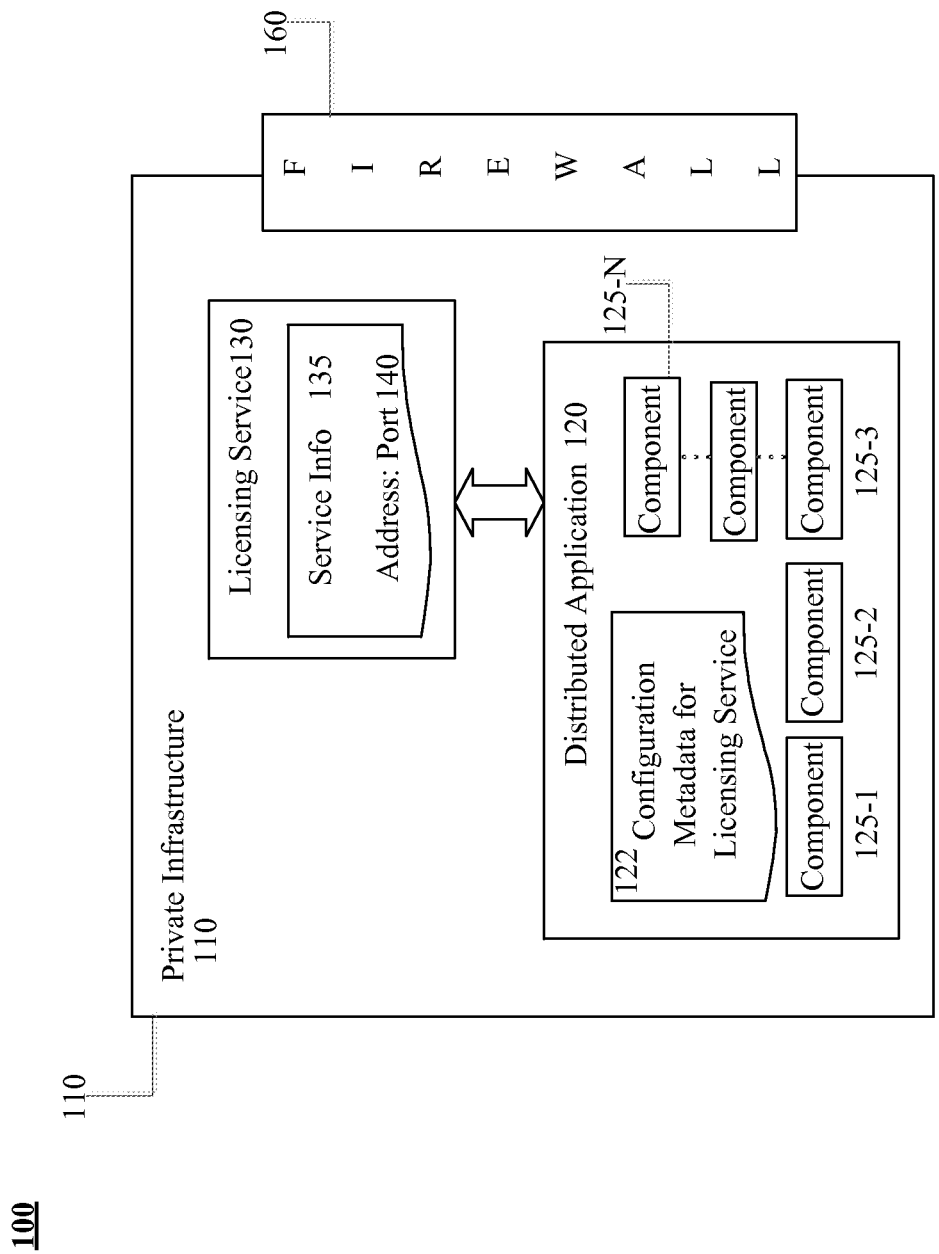
FIG. 1 shows a block diagram illustrating the typical architecture of a system to facilitate interaction between an application and service components running on a private infrastructure.

FIG. 1 shows a block diagram illustrating the typical conventional architecture of system 100 showing interaction between distributed application 120 and services running on a private infrastructure.

Private infrastructure 110 may include a private cloud running distributed application 120. Distributed application 120 may comprise several components 125-1, 125-2 . . . 125-N. One or more of components 125-1, 125-2 . . . 125-N may request access to a service. Services requested by the components may include database related services that facilitate component interaction with databases; licensing services to obtain licenses to run components; user authentication services to request access for users running an application; workflow-integration services; various remote services accessible over protocols like hypertext transfer protocol ("http") and remote method invocation ("rmi"); etc. In general, services may comprise an application or group of applications that facilitate access to, or provide, functionality requested by a component.

In FIG. 1, the service is shown as Licensing Service 130. For ease of explanation, FIG. 1 and subsequent figures will be described in relation to Licensing Service 130. However, it should be noted that the techniques described herein are not restricted to exemplary Licensing Service 130 shown, but are also applicable to various other types of services with appropriate modifications as would be apparent to one of ordinary skill in the art. One or more components 125 may interact with Licensing Service 130 to check out licenses. Licensing Service 130 may be an application available from third party vendors that facilitates the management of application licenses.

In some instances, a license to use an application may be node locked thereby associating the software with a specific machine and restricting application runs to the specified machine. In other instances, a pool of floating licenses may be allocated dynamically to users and a license may be checked-out when a user begins using some software on a machine and checked-in when the user finishes using the software. For example, a pool of 50 floating licenses for an application can support a large user community provided that no more than 50 users make simultaneous use of the licensed application.

Application licenses are often tied to a specific licensing service and the licenses often cannot be moved to a different licensing service running on a different machine or infrastructure. For example, a licensing service or license server that provides licenses to applications may be locked to a specific network MAC address, or may need to read a local USB encryption key. For example, one or more licenses requested by components 125 may be tied to Licensing Service 130.

Components 125 may request licenses from Licensing Service 130 using information in Configuration Metadata for Licensing Service 122, which may include the host name, host id, and/or the network address and port number as well as other information for interacting with Licensing Service 130 such as any configuration information that may be specific to the implementation of the licensing service such as environment variables and/or specific protocols [e.g.; http, Simple Object Access Protocol ("soap"), or remote method invocation], that may be required for interacting with the service along with accompanying request parameters. In general, information in Configuration Metadata for Licensing Service 122 may be used to permit components 225 to seamlessly interact with Licensing Service 130. Licensing Service 130 may use Service Information 135, which may include information pertaining to application licenses currently administered by the server, the number(s) of such licenses, the nature of the licenses (e.g.; are they floating or fixed), etc., and communicate with requesting components 125 to grant or deny licenses. In FIG. 1, both Licensing Service 130 and Distributed Application 120 are both running on Private Infrastructure 110 and behind Firewall 160. Therefore, for computations run entirely on private cloud infrastructures on one side of Firewall 160, such as distributed application 120, Firewall 160 is not involved when components 125 interact with Licensing Service 130. In general, Firewall 160 may not be involved when one or more components 125 communicate or interact with one or more services provided within Firewall 160, which protects Private Infrastructure 110.

Figure 2:
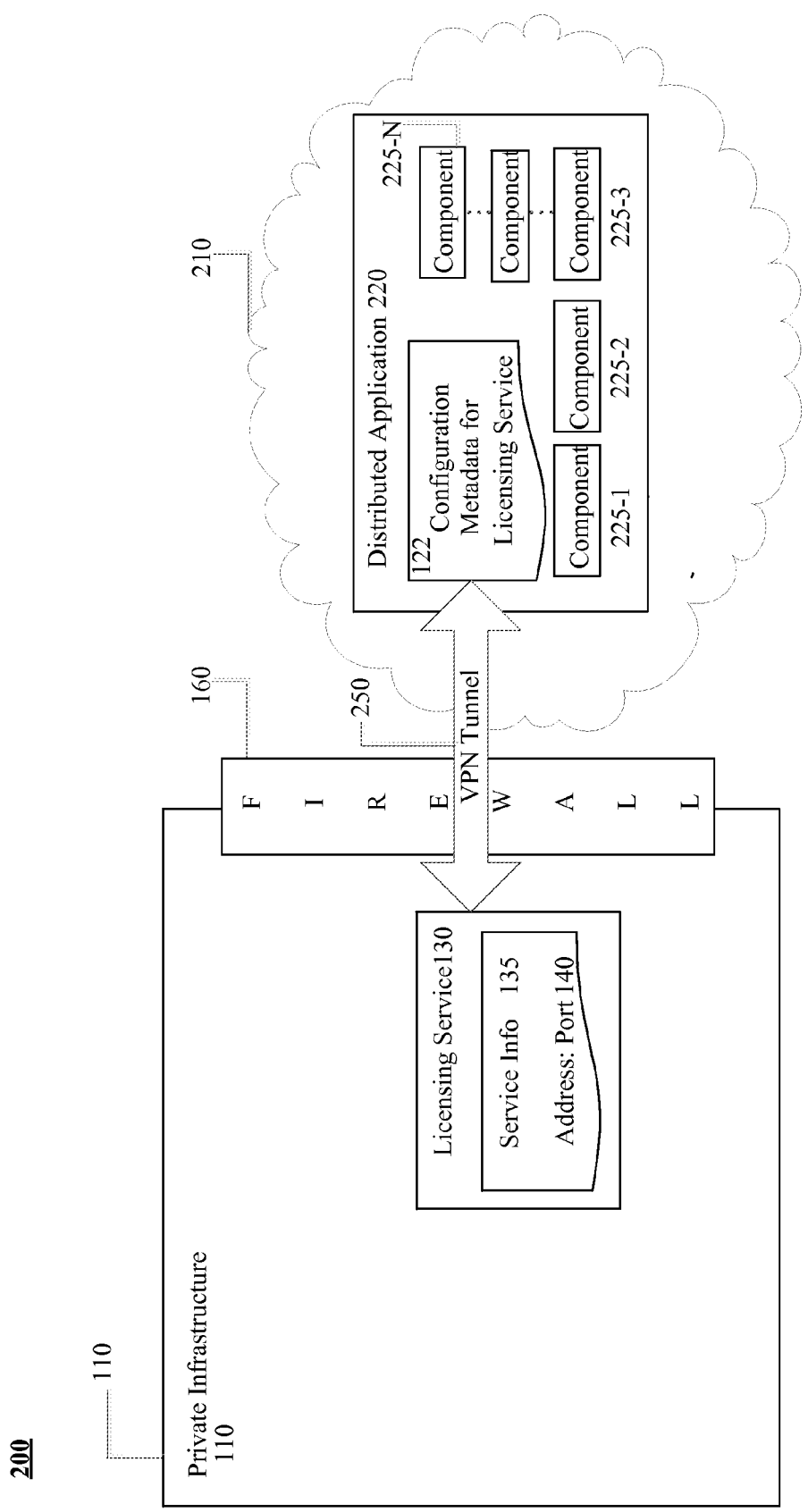
FIG. 2 shows a block diagram illustrating conventional approaches to facilitate interaction between an application running on a public cloud and service components running on a private infrastructure.

FIG. 2 shows a block diagram illustrating conventional approaches to facilitate interaction between an application running on a public cloud and service components running on a private infrastructure. With the evolution of highly available public clouds, which provide on-demand access to high performance computing capabilities over the Internet, there is a growing trend among organizations to migrate computations to public clouds to increase efficiencies and scalability, while reducing the costs associated with maintaining large private computing clusters.

FIG. 2 shows Distributed Application 220 running on public cloud 210. Distributed Application 220 may comprise components 225-1, 225-2 . . . 225-N. In some instances, the porting of services to public clouds may not be desirable or practical. For example, while an organization may be willing to port code to run on public cloud 210, the organization may be unwilling to move private databases to public cloud for reasons related to security, confidentiality, and/or the size of the database etc. In situations where moving the database and/or related services to the Public Cloud 210 is not practical, and where Distributed Application 210 (which runs on Public Cloud 210) accesses the database at runtime, alternate methods of providing Distributed Application 210 with access to database services are desirable.

In FIG. 2, exemplary Licensing Service 130 is shown as a service that runs on private infrastructure 110. As noted earlier, application licenses are often tied to a specific licensing service and the licenses often cannot be moved to a different licensing service running on a different machine or infrastructure. For example, a licensing service or license server that provides licenses to applications may be locked to a specific network MAC address, or may need to read a local USB encryption key. In such situations, it may not be practical to move the licensing service to the public cloud. For example, one or more licenses requested by components 125 may be tied to Licensing Service 130 and it may be impractical to move Licensing Service 130 because a local USB-device based encryption key is read by Licensing Service 130.

As shown in FIG. 2, Licensing Service 130 runs on Private Infrastructure 110, while Distributed Application 220 runs on Public Cloud 210, which is on the other side of Firewall 160. In general, a firewall is a device, or software, or some combination of hardware and software that permits or denies network communications between entities on different sides of the firewall based upon a set of rules. Firewall 160 may protect Private Infrastructure 110 from unauthorized access while permitting legitimate communications to pass. Firewall 160 may operate at one or more layers of the Transmission Control Protocol/Internet Protocol ("TCP/IP"). For example, Firewall 160 may be comprise (i) a packet filter, which may work at the Network level of the TCP/IP stack and inspect individual packets for conformance with its rule sets, and/or (ii) an application filter, which may work at the Application level of the TCP/IP stack and inspect traffic to determine if the traffic is associated with applications such as browsers, telnet, and/or file transfer protocol ("ftp") traffic. Packets associated with permitted applications that match rules in firewall 160 may be allowed to pass while packets associated with other (non-permitted) applications are blocked. In principle, application firewalls can prevent all unwanted outside traffic from reaching protected machines in Private Infrastructure 110. Typically, firewalls allow connections on some ports, such as hypertext transfer protocol ("http") on Port 80, secure hypertext transfer protocol ("https") on port 443, etc., which relate to browser based Internet traffic.

For applications running on hybrid private-public infrastructures (as in shown FIG. 2, where Distributed Application 220 runs on Public Cloud 210 and Licensing Service 130 runs on Private Infrastructure 110), Firewall 160 may prevent communication between Licensing Service 130 and Distributed Application 220. Therefore, in order to allow communication between Licensing Service 130 and Distributed Application 220, rule sets in Firewall 160 may need to be modified to permit such communication. The modification of rule sets in Firewall 160 increases the vulnerability of Private Infrastructure 110 to external threats and additionally creates impediments to the migration of applications to public clouds because of the overhead presented by additional network administration tasks related to configuration of the firewall.

One approach to permit communication between Licensing Service 130 and Distributed Application 220 through Firewall 160 involves the use of Virtual Private Network ("VPN") Tunnel 250. VPN Tunnel 250. A virtual private network may use a public network, such as the Internet, to provide remote access to Private Infrastructure 110 through Firewall 160. To start a VPN session and create VPN tunnel 250 remote users who want access to resources, applications, and/or services provided by Private Infrastructure 110 are authenticated. Upon successful authentication secure VPN tunnel 250 may be established between tunnel endpoints. Authentication to establish VPN Tunnel 250 between Distributed Application 220 on Public Cloud 210 and Licensing Service 130 on Private Infrastructure 110 may use passwords, digital certificates, keys, and/or other cryptographic methods that permit automatic authentication without user intervention.

Data exchanged after successful authentication is secured using encryption technologies to prevent disclosure of private information to unauthorized parties. In general, upon successful access to Private Infrastructure 110 using VPN tunnel 250, Distributed Application 220 may act as if it was connected directly to the Private Infrastructure 110 without regard to the presence of Firewall 160. Once operational, VPN Tunnel 250 permits access to all network functionality found on Private Infrastructure 110, including access to network resources, services etc.

When Components 125 request licenses from Licensing Service 130 using information in Configuration Metadata for Licensing Service 122, the requests are conveyed through VPN tunnel 250 to Licensing Service 130, which either grants or denies a license. Information in Configuration Metadata for Licensing Service 122 may include information for interacting with Licensing Service 130 such as the host name, host id, and/or the network address and port number for a machine running Licensing Service 130. In general, information in Configuration Metadata for Licensing Service 122 may be used to permit components 225 to seamlessly interact with Licensing Service 130 through VPN tunnel 250. Licensing Service 130 may use Service Information 135 and communicate with requesting components 125 to grant or deny licenses.

One drawback of using VPN tunnel 250 is that entire Private Infrastructure 110 may potentially be exposed when the VPN tunnel is active. Therefore, if security or authentication procedures associated with VPN tunnel 250 are compromised, there may be a substantial security risk to Private Infrastructure 110. These security risks may be mitigated somewhat by creating a special user class or group for public cloud applications such as Distributed Application 220 and limiting privileges available to the group. However, the creation of the special user group as well as establishing VPN access to Private Infrastructure 110 requires permission, intervention, and set up by a network administrator thereby preventing quick seamless deployment of applications on Public Cloud 210. Moreover, these procedures are repeated for each Public Cloud 210 on which applications are run. For example, for an application capable of being deployed on Amazon, Rackspace, and/or Terremark in the VPN tunnel scenario, authentication procedures to establish VPN tunnel 250 are repeated for each cloud thereby impeding application deployment across multiple clouds.

Seamless deployment and running of applications on hybrid public-private infrastructures is facilitated when: (i) The service requested by the distributed application (such as the Licensing Service) is not changed as a consequence of deployment; (ii) The firewall configuration is not changed (assuming that well-known ports such as for secure hypertext transfer protocol ("https") are open); (iii) There are no changes to the core distributed application (iv) Services utilized by the distributed application are accessible without exposing the entire private infrastructure; (v) there are no impediments to interaction between the distributed application and the requested service and (v) the service requested is not made available to unauthorized applications and/or users. The VPN tunnel solution does not provide seamless deployment and running of applications on hybrid infrastructures at least because of changes to the firewall configuration to allow VPN access and because VPN tunneling exposes the entire private infrastructure to the distributed application when the VPN tunnel is operational.

Figure 3:
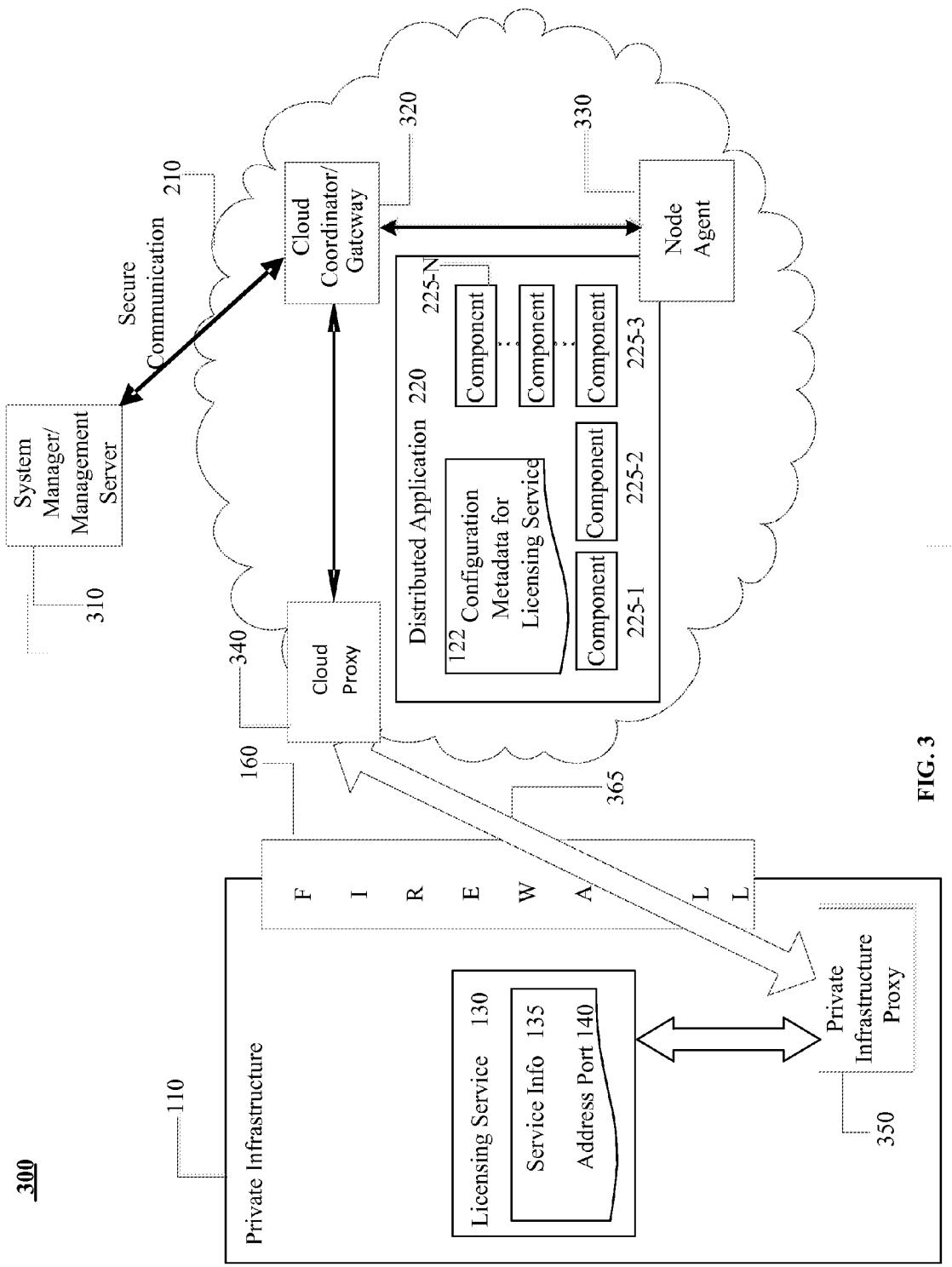
FIG. 3 shows an exemplary block diagram illustrating the architecture of a system to facilitate interaction between an exemplary application running on a public cloud and exemplary service components running on a private infrastructure consistent with embodiments disclosed herein.

FIG. 3 shows an exemplary block diagram illustrating the architecture of System 300, consistent with disclosed embodiments, to facilitate interaction between an exemplary distributed application running on a public cloud and exemplary service components running on a private infrastructure. Although System 300 is shown in FIG. 3 with a single cloud (Public Cloud 210), in general, System 300 may comprise one or more public clouds. A single cloud is used in the embodiments described below to simplify explanation only. System 300 may easily be extended to multiple clouds and multiple private infrastructures as would be apparent to one of ordinary skill in the art.

As shown in FIG. 3, Distributed Application 220 may run on public cloud 210. Distributed Application 220 may comprise components 225-1, 225-2 . . . 225-N. In some embodiments, Distributed Application 220 may be a cloud-specific implementation of an infrastructure independent representation of a distributed application. In FIG. 3, exemplary Licensing Service 130 is shown as a service that runs on Private Infrastructure 110. As noted earlier, the use of Licensing Service 130 is exemplary and for descriptive purposes only. In general, one or more services running on Private Infrastructure 110 may interact with Distributed Application 220. As shown in FIG. 3, exemplary Licensing Service 130 runs on Private Infrastructure 110 on one side of Firewall 160, while Distributed Application 220 runs on Public Cloud 210, which is on the other side of Firewall 160.

In some embodiments, System 300 may comprise a System Manager or Management Server 310. For example, System Manager 310 may provide APIs for managing templates and modeling new applications. In one embodiment, System Manager 310 may provide a user console or browser interface to allow users to: model and import applications for deployment, upload application data, share one or more applications, invoke an application to run securely on a cloud infrastructure, and provide run time inputs for deploying applications. In some embodiments, System Manager 310 may be used to manage and deploy Distributed Application 220. In some embodiments, System Manager 310 may be used to provide information that may facilitate the configuration of Distributed Application 220 with Configuration Metadata for the Licensing Service 122. In some embodiments, System manager 310 may communicate with Cloud Coordinator/Gateway 320 using secure communication interlinks. In some embodiments, System manager 310 may communicate with Cloud Coordinator/Gateway 320 over an https based secure communication channel.

In some embodiments, Cloud Coordinator/Gateway 320 may orchestrate application deployment, scaling, management and tear-down on a cloud such as Public Cloud 210. In some embodiments, system 300 may have multiple clouds (not shown) and one Cloud Coordinator/Gateway 320 per cloud. In some embodiments, System Manager 310 may invoke and instruct Cloud Coordinator/Gateway 320 for Public Cloud 210 to orchestrate the deployment of Distributed Application 220 on that cloud. For example, system manager 310 may pass an infrastructure independent application model to coordinator/gateway 320 for Public Cloud 210, which may be one of Amazon, Rackspace, Terremark, etc. In some embodiments, coordinator/gateway 320 may maintain a library of cloud specific implementations for primitives and composite interfaces for Public Cloud 210. When an application is to be deployed, coordinator/gateway 320 can use the library to perform deployment and execution tasks for Public Cloud 210.

In some embodiments, Cloud Coordinator/Gateway 320 may be used to initiate the configuration of Distributed Application 220 by setting up Configuration Metadata for the Licensing Service 122. In some embodiments, Cloud Coordinator/Gateway 320 may initiate configuration Distributed Application 220 with Configuration Metadata for the Licensing Service 122 using information received from System manager 310 so that each node used by Distributed Application 220 can seamlessly interact with Licensing Service 130. Information in Configuration Metadata for the Licensing Service 122 may be used to permit Distributed Application 220 to interact seamlessly with Licensing Service 130.

In some embodiments, Cloud Coordinator/Gateway 320 may also interact with Node Agent 330 to complete the application orchestration. In some embodiments, Cloud Coordinator/Gateway 320 may also instantiate Cloud Proxy 340 with information gathered from the System manager 310 about the Licensing Service 130, and user information obtained through the Private Infrastructure Proxy 350. For example, upon instantiation Cloud Proxy 340 may establish Secure Tunnel 365 to Private Infrastructure Proxy 350 for secure and selective access to the Licensing Service 130. In some embodiments, Cloud Coordinator/Gateway 320 may direct Node Agent 330 to monitor and report task status back to coordinator/gateway 320 and perform other tasks. In some embodiments, Node Agent 330 may be a process that can set up a node to interact with Cloud Proxy 340 so that Components 225 can seamlessly interact with the Licensing Service 130 while running on that node. A node refers to a physical machine that is capable of running virtual machines. For example, Node Agent 330 may add information relating to Cloud Proxy 340 in Configuration Metadata for the Licensing Service 122 to permit communication between Components 225 in Distributed Application 220 and Cloud Proxy 340.

In some embodiments, Cloud Coordinator/Gateway 320 may also interact with Cloud Proxy 340. Cloud Proxy 340 may take the form of a process that maintains trusted and secure communications with Private Infrastructure Proxy 350. In some embodiments, Private Infrastructure Proxy 350 may take the form of a virtual appliance. In general, a software appliance is a software application, which may be combined with an operating system so that the software can be run easily on industry standard hardware or virtual machines. A virtual appliance may be created when the installation of a software appliance on a virtual machine is packaged. Thus, a virtual appliance refers to a virtual machine image that can run on a virtualization platform. A virtual machine image may take the form of a filesystem image and may include an operating system and the software required to deliver functionality or services.

In some embodiments, Private Infrastructure Proxy 350 (which is behind firewall 160) may initiate the establishment of Secure Tunnel 365 to Cloud Proxy 340 using the network address and port specified for Licensing Service 130. Secure Tunnel 365 may be mutually authenticated and may be initiated and established over well-known ports such as https (port number 443), which are typically open, so that no changes are made to existing firewall policy. In some embodiments, by detailing a specific network address and port number for Licensing Service 130, Cloud Proxy 340 may access and interact with Licensing Service 130 over Secure Tunnel 365 but may not have access to other resources and/or services on Private Infrastructure 110.

In some embodiments, the network address and port number for Licensing Service 130 may be entered by a user, or may be obtained from a file or script, during the set up of Private Infrastructure Proxy 350. Private Infrastructure Proxy 350 may also receive the network address and port number for Cloud Proxy 340 from the System Manager 310, and use the network address and port information to set up Secure Tunnel 365 between Private Infrastructure Proxy 350 and Cloud Proxy 340. For example, in some embodiments, the network address and port number for Licensing Service 130 may be read from a file, or entered by user during the initial configuration of Private Infrastructure Proxy 350.

In one embodiment, Cloud Coordinator/Gateway 320 may use information received from System Manager 310 to direct Node Agent 330 to configure a node for communication/interaction with Cloud Proxy 340. Node Agent 330 may store information to facilitate communication between a node and Cloud Proxy 340 in Configuration Metadata for the Licensing Service 122, which may then be used by components 225 in Distributed Application 220 to request access to Licensing Service 130 using Secure Tunnel 365 established between Cloud Proxy 340 and Private Infrastructure Proxy 350. In some embodiments, License Service 130's network address and port information may not be directly exposed to System Manager 310, Cloud Coordinator/Gateway 320, Node Agent 330 and/or Cloud Proxy 340.

In some embodiments, System Manager 310, Cloud Coordinator/Gateway 320, Node Agent 330, Cloud Proxy 340, and Private Infrastructure Proxy 350 may be functional modules of a service that automatically deploys and runs cloud-specific implementations obtained from an infrastructure independent representation of Distributed Application 220 on Public Cloud 210.

Figure 4:
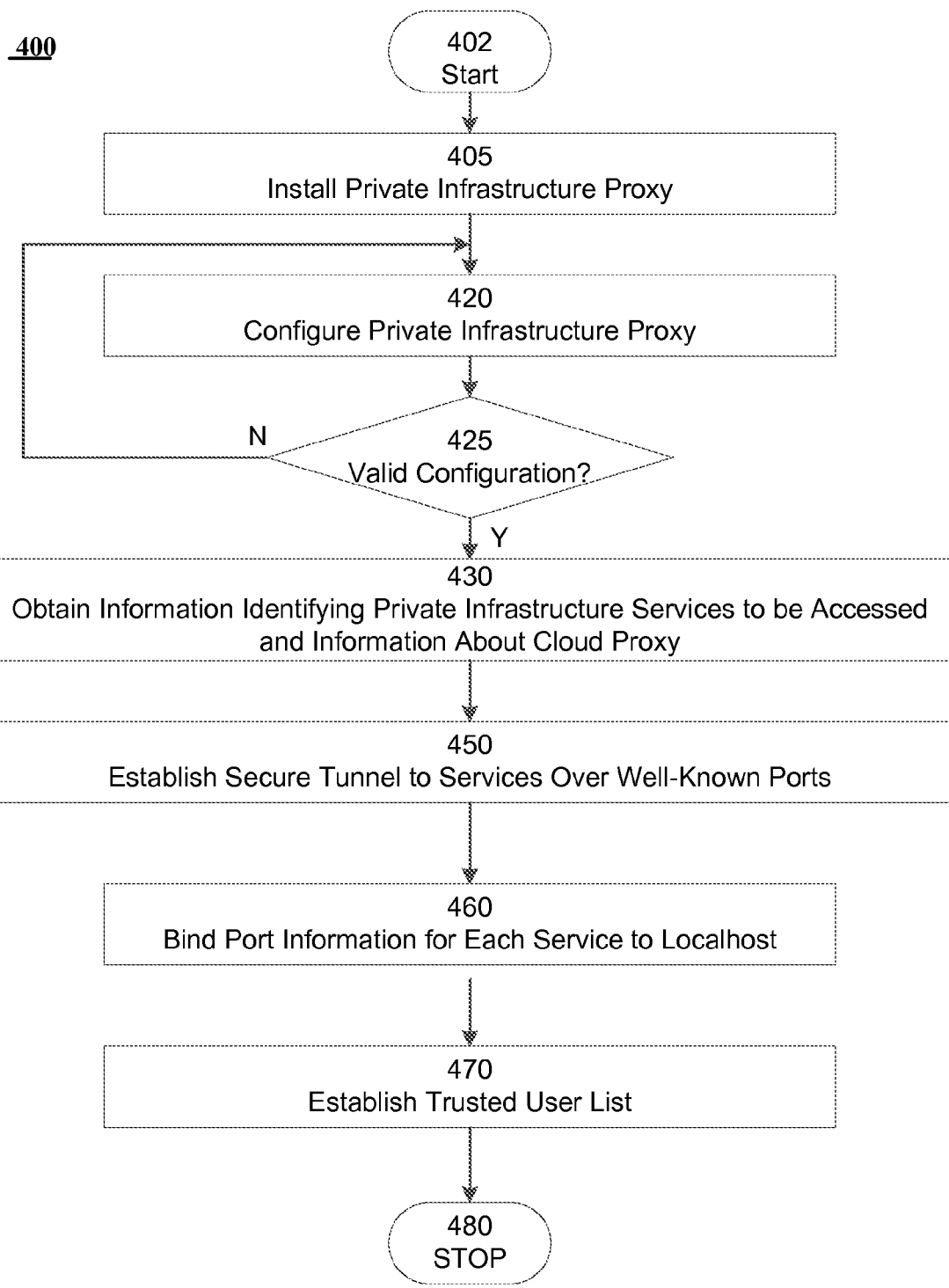
FIG. 4 shows an exemplary flowchart detailing steps in the initial set up and process flow for an exemplary method to facilitate secure access to selected services during computations performed using hybrid public-private infrastructures.

FIG. 4 shows an exemplary flowchart detailing steps in the initial set up and process flow for an exemplary method 400 to facilitate secure access to selected services during computations performed using hybrid public-private infrastructures. In some embodiments, portions of exemplary method 400 may be performed by a script or other program code. In some embodiments, the initial process to set up secure access to selected services during computations performed using hybrid public-private infrastructures may be initiated in step 402.

Next, in step 405, a proxy for Private Infrastructure 110, such as Private Infrastructure Proxy 350, may be installed. In some embodiments, Private Infrastructure Proxy 350 may take the form of a virtual appliance. In step 420, Private Infrastructure Proxy 350 may be configured. For example, user information pertaining to users of Public Cloud 210 may be obtained. In some embodiments, the user information may pertain to a service that automatically deploys and runs cloud-specific implementations obtained from an infrastructure independent representation of Distributed Application 220 on Public Cloud 210. The user information may include a user name, password, as well any other information used to authenticate a user with the service and/or with Public Cloud 210. In step 425, the configuration information obtained may be validated. For example, Private Infrastructure Proxy 350 may connect to System Manager 310 using https to determine if the user information obtained is valid. If the information is valid, ("Y" in step 425) then, the algorithm may proceeds to step 430, otherwise ("N" in step 425) the algorithm may return to step 420.

In step 430, set up process 400 may obtain information about one or more services to be accessed in Private Infrastructure 110 as well as information pertaining to Cloud Proxy 340. The information obtained may include network address and port information for each service to be accessed in Private Infrastructure 110. For example, the network and port information for Licensing Service 130 may be obtained. The network address may be specified as a hostname and/or IP address. For example, the network address for Licensing Service 130 may be specified as "license_server.local.mycompany.com" and the port number for Licensing Service 130 may be specified as 7000. Similarly, information for Cloud Proxy 340 may be specified, with network address as "license_proxy.osmosix.com" and the port specified as port 7001.

In step 450, upon successful mutual authentication between Private Infrastructure Proxy 350 and Cloud Proxy 340, Secure Tunnels 365 may be established from each service to the proxy on the public cloud. For example, Secure Tunnel 365 may be established from Private Infrastructure Proxy 350 to Cloud Proxy 340 across firewall 160. In some embodiments, a well-known port such as Port 443 (https) may be used to help establish Secure Tunnel(s) 365. For example, Private Infrastructure Proxy 350 may use https for mutual authentication with Cloud Proxy 340, and upon successful mutual authentication establish Secure Tunnel(s) and expose Licensing Service 130 running on license_server.local.mycompany.com:7000 securely and selectively to authenticated Cloud Proxy 340.

In step 460, upon successful mutual authentication, Cloud Proxy 340 may bind port 7001 to its localhost. The term "localhost" refers to the originating computer and is the standard hostname given to the address of the loopback network interface. When communicating with the loopback interface the local network interface hardware is bypassed but communication otherwise occurs in a manner identical to communication with other computers on a network. Next, in step 470, Cloud Proxy 340 may query System Manager 310 for user information to establish a trusted user list with permission to access Cloud Proxy port 7001. The process may then terminate in step 480.

Figure 5:
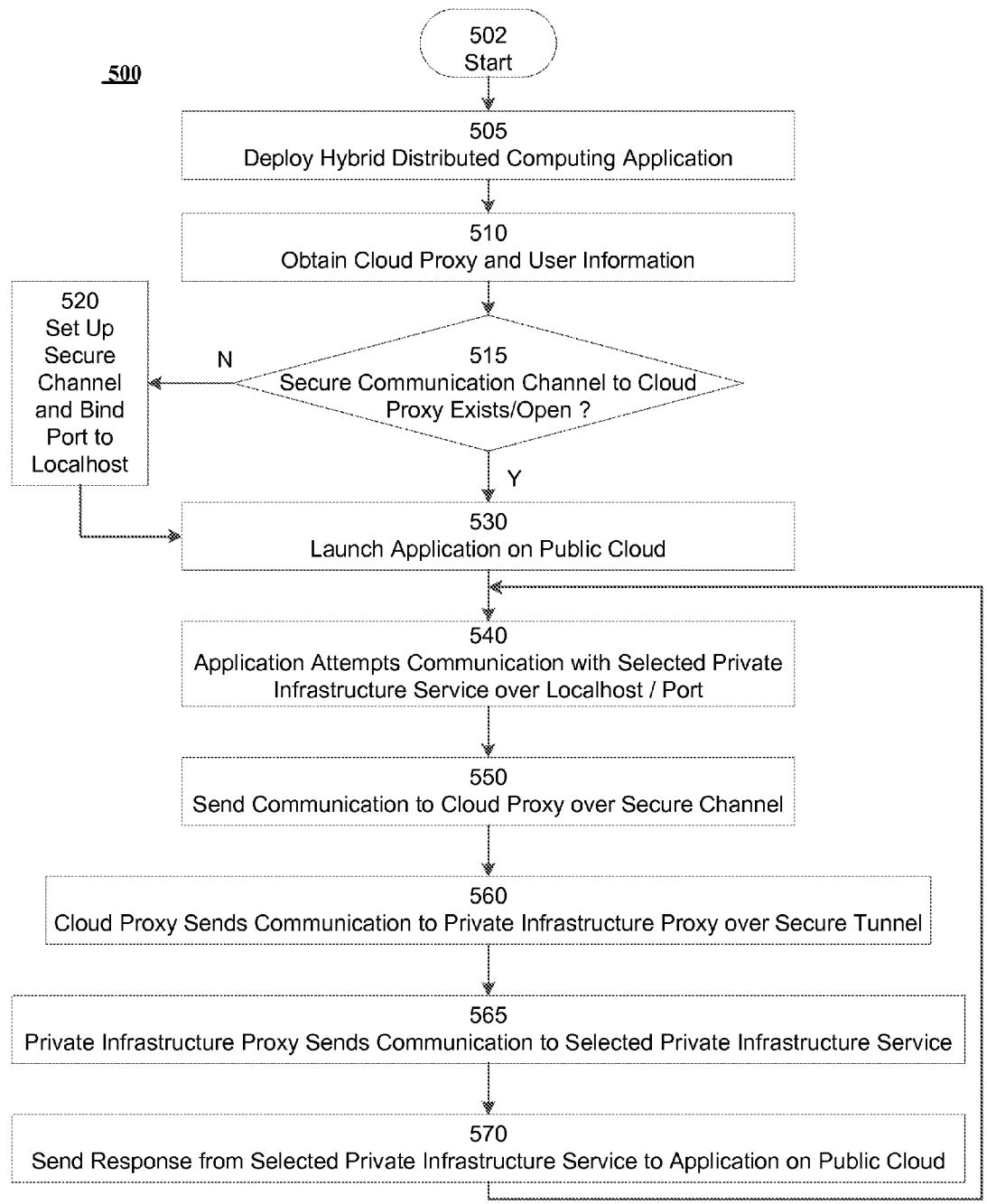
FIG. 5 shows a flowchart illustrating an exemplary method to facilitate authorized applications running on a public cloud secure access to selected services running on a private infrastructure.

FIG. 5 shows a flowchart illustrating an exemplary method 500 to facilitate authorized applications running on a public cloud secure access to selected services running on a private infrastructure. In some embodiments, portions of method 500 may be performed by a script or other program code. In some embodiments, exemplary method 500 may start at step 502. In step 505, the distributed application may be deployed. For example, Distributed Application 220 may be deployed on Public Cloud 210 and Node Agent 330 may be launched on the node running Distributed Application 220 as part of application deployment. In some embodiments, Node Agent 330 may obtain information pertaining to address and port information for Cloud Proxy 340 and user information for the user running Distributed Application 220 from Cloud Coordinator/Gateway 320.

In step 515, Node Agent 330 checks if the communication channel to cloud proxy is already open. If the channel is open, then, method 500 may proceed to step 530. If not ("N" in step 515), then, in some embodiments, in step 320, Node Agent 330 may set up a secure channel to Cloud Proxy 340 after mutual authentication. In step 320, Node Agent 330 may use the credentials of the current user during the mutual authentication process. Cloud Proxy 340 may then check if the current user is entitled to access the requested port. If the current user is entitled to access the requested port on Cloud Proxy 340, then Node Agent 330 may establish a secure channel between the localhost and the requested port on Cloud Proxy 340 and will bind the port to localhost. For example, Node Agent 330 may be able to access port 7001 on license_proxy.osmosix.com as the current user. In the event that mutual authentication fails (not shown), the application launch will fail without the establishment of the secure channel. Upon authentication the secure communication channel is set up and method 500 may proceed to step 530.

In step 530, Node Agent 330 may launch Distributed Application 220 on Public Cloud 210 and Distributed Application 220 may commence running on the node(s). Next, in step 540, Distributed Application 220 may attempt communication with a service running on Private Infrastructure 110 using localhost and the specified port number. For example, Distributed Application 220 may attempt communication with Licensing Service 130 at localhost:port 7001.

In step 550, the communication initiated by Distributed Application 220 is seamlessly and securely routed over the communication channel established earlier to Cloud Proxy 340. Upon receiving the communication, in step 560, Cloud Proxy 340 may send the communication over Secure Tunnel 365 to Private Infrastructure Proxy 350. For example, Cloud Proxy 340 may send the communication to "license_server-.local.mycompany.com:7000", which represent the address and port number of Private Infrastructure Proxy 350.

Next, in step 565, Private Infrastructure Proxy 350 sends the communication to the selected service. For example, Private Infrastructure Proxy 350 may send the communication to Licensing Service 130. In step 570, the service on Private Infrastructure Proxy 350 may respond to the communication and the response is sent back to Distributed Application 220 through Private Infrastructure Proxy 350 and Cloud Proxy 340. For example, the grant or denial of a license by Licensing Service 130 may be sent to Private Infrastructure Proxy 350 and then over the Secure Tunnel 365 to Cloud Proxy 340 at license_proxy.osmosix.com: 7001 and then by Cloud Proxy 340 to Distributed Application 220. Steps 540-570 may be repeated during the running of Distributed Application 220. When Distributed Application 220 completes execution the secure communication channel between Distributed Application 220 and Cloud Proxy 340 may be torn down. In some embodiments, Node Agent 330 may tear down the secure communication channel between Distributed Application 220 and Cloud Proxy 340.

In some embodiments, there may be one or more cloud proxies 340 per cloud. The use of more than multiple cloud proxies 340 may increase scalability and allow load balancing between cloud proxies 340, in addition to providing fault-tolerance between cloud proxies. In some embodiments, multiple cloud proxies 340 may facilitate access to different types of services on different ports.

In other embodiments, there may be 1 cloud proxy 340 for multiple clouds. For example, in situation where a single cloud proxy 340 serves multiple clouds, a node agent 330 in one of the clouds served by cloud proxy 340 may obtain the IP address of cloud proxy 340 and establish Secure Tunnel 365 with cloud proxy 340. In some embodiments, cloud proxy 340 serving multiple clouds may be centrally managed. In some embodiments, the IP address of cloud proxy 340, which serves multiple clouds, may be public.

Although the exemplary embodiments shown discuss secure access to selected services during computations, where the selected services are deployed within private infrastructures, the disclosure is not restricted to the exemplary embodiments discussed. For example, persons of ordinary skill in the art will appreciate that system 300, which includes private proxy 350 and cloud proxy 340, may be configured to provide secure access to select application services hosted on public network. For example, system 300 may be used to allow secure selective access to Licensing Service 130, or other application services running on a server that is publicly accessible over the Internet. However, access to the select application services available on the publicly accessible server may be provided securely and may be restricted to authorized distributed applications by using techniques described above.

Note that although the description above uses exemplary cloud infrastructures and exemplary services to describe possible implementations, alternate implementations are envisaged and the methods described could be extended to other cloud infrastructures as would be apparent to one of ordinary skill in the art. Further, although various exemplary modules such as System Manager 310, Cloud Coordinator/Gateway 320, Node Agent 330, Cloud Proxy 340, and Private Infrastructure Proxy 350 have been identified as performing certain functions, the descriptions of the above modules and their functions are exemplary only.

Various other configurations and distribution of functionality among modules are possible as would be apparent to one or ordinary skill in the art. In some embodiments, software to facilitate conducting the processes described above can be recorded on computer-readable media or computer-readable memory. These include, but are not limited to, hard drives, solid state drives, optical media, removable media, memory cards, flash drives, and the like. Further networks disclosed may be wired or wireless networks. The services and/or applications and other program code may run on various individual and networked processors and/or computing devices, which may support virtualization.

Other embodiments of the present invention will be apparent to those skilled in the art from consideration of the specification and practice of one or more embodiments of the invention disclosed herein. It is intended that the specification and examples be considered as exemplary only, with a true scope and spirit of the invention being indicated by the following claims.

What is claimed is:
1. A processor-implemented method comprising:
establishing at least one secure tunnel between a first proxy, wherein the first proxy is identified by a first network address and a first port number on a private infrastructure, and a second proxy associated with a distributed computing application executing on a public cloud infrastructure, wherein the second proxy is identified by a second network address and a second port number;
limiting access requests received from the distributed application to at least one selected application service from a plurality of application services available on the private infrastructure, wherein the access requests are initiated using the second network address and second port number, wherein limiting access comprises:
receiving by the first proxy, the access requests from the distributed computing application, wherein the distributed computing application is configured with access information comprising the second network address and the second port number to access the at least one selected application service through the second proxy over the secure tunnel upon verification that the distributed computing application is authorized to access the second network address and second port number, the access requests comprising the first network address and first port number, wherein the first proxy determines if the access requests are for the at least one selected application service and limits the forwarding of access requests to those access requests specifically directed to the at least one selected service by disabling forwarding of access requests not directed to the at least one selected application service.

2. The processor-implemented method of claim 1, further comprising:
receiving a response to the access request from the at least one selected application service at the first proxy; and
sending the response from the first proxy to the second proxy over the secure tunnel using the second network address and second port number.

3. The processor-implemented method of claim 1, wherein the distributed computing application is a cloud-specific implementation for the public cloud infrastructure, the cloud-specific implementation derived from an infrastructure independent representation of the distributed computing application.

4. The processor-implemented method of claim 3, wherein the cloud-specific implementation of the distributed computing application for the public cloud infrastructure is realized by utilizing a library of program routines that implement system and pattern primitives on the public cloud infrastructure.

5. The processor-implemented method of claim 1, wherein the at least one selected application service comprises one or more of a licensing service, a database access service, a user authentication service, a workflow-integration service, a remote service accessible over http, or a remote service accessible over remote method invocation ("rmi") protocol.

6. The processor-implemented method of claim 1, wherein the secure tunnel between the first proxy and second proxy is established using the https protocol.

7. The processor-implemented method of claim 1, wherein the public cloud infrastructure is one of Amazon EC2, Terremark vCloud, Rackspace Cloudserver, Microsoft Azure, or Savvis.

8. The processor-implemented method of claim 1, wherein the first proxy is configured as a virtual appliance.

9. The processor-implemented method of claim 1, wherein the private infrastructure is protected by a firewall.

10. A system comprising:
a private infrastructure comprising a processor and memory, the private infrastructure capable of hosting at least one selected application service of a plurality of application services available on the first infrastructure;
a first proxy accessible over a public network, the first proxy being identified by a first network address and a first port number on a private infrastructure;
a secure tunnel between the first proxy and a second proxy associated with a distributed computing application executing on a public cloud infrastructure, wherein the second proxy is identified by a second network address and a second port number; wherein:
the first proxy receives access requests comprising the first network address and first port number over the secure tunnel from a distributed computing application, wherein the distributed computing application is configured with access information comprising the second network address and the second port number to access at least one selected application service upon verification that the distributed computing application is authorized to access the second network address and second port number, and
the first proxy determines if the access requests are for the at least one selected application service and limits the forwarding of access requests to those directed to the at least one selected application service by disabling forwarding of access requests not directed to the at least one selected application service.

11. The system of claim 10, wherein the first proxy and the second proxy are accessible over the Internet.

12. The system of claim 10, wherein the secure tunnel between the first proxy and the second proxy is established using the https protocol.

13. The system of claim 10, wherein:
the first proxy receives a response to the access request from the at least one selected application service; and
the first proxy sends the response to the second proxy over the secure tunnel using the second network address and port number.

14. The system of claim 10, wherein the at least one selected application service comprises one or more of a licensing service, a database access service, a user authentication service, a workflow-integration service, a remote service accessible over http, or a remote service accessible over remote method invocation ("rmi") protocol.

15. A non-transitory computer-readable medium comprising instructions, which when executed by a computer perform steps in a method, the computer implemented steps comprising:
establishing at least one secure tunnel between a first proxy, wherein the first proxy is identified by a first network address and a first port number on a private infrastructure, and a second proxy associated with a distributed computing application executing on a public cloud infrastructure wherein the second proxy is identified by a second network address and a second port number;
limiting access requests by the distributed computing application to at least one selected application service from a plurality of services available on the private infrastructure, wherein the access requests are initiated using the second network address and the second port number, wherein limiting access further comprises:
receiving by the first proxy, the access requests from the distributed computing application, wherein the distributed computing application is configured with access information comprising the second network address and the second port number to access the at least one selected application service through the second proxy over the secure tunnel upon verification that the distributed computing application is authorized to access the second network address and second port number, the access requests comprising the first network address and the first port number, and wherein
the first proxy determines if the access requests are for the at least one selected application service and limits the forwarding of access requests specifically to the to those access requests directed to the at least one selected one application service by disabling forwarding of access requests not directed to the at least one selected application service.

16. The computer-readable medium of claim 15, further comprising:
receiving a response to the access request from the at least one selected application service at the first proxy; and
sending the response from the first proxy to the second proxy over the secure tunnel using the second network address and the second port number.

* * * * *